(12) United States Patent
Mayer et al.

(10) Patent No.: US 10,996,956 B2
(45) Date of Patent: May 4, 2021

(54) CONTROL SYSTEM FOR PROCESS DATA AND METHOD FOR CONTROLLING PROCESS DATA

(71) Applicant: Infineon Technologies AG, Neubiberg (DE)

(72) Inventors: Albrecht Mayer, Deisenhofen (DE); Glenn Ashley Farrall, Long Ashton (GB)

(73) Assignee: Infineon Technologies AG, Neubiberg (DE)

( * ) Notice: Subject to any disclaimer, the term of this patent is extended or adjusted under 35 U.S.C. 154(b) by 223 days.

(21) Appl. No.: 15/945,114

(22) Filed: Apr. 4, 2018

(65) Prior Publication Data

US 2018/0300144 A1     Oct. 18, 2018

(30) Foreign Application Priority Data

Apr. 18, 2017   (DE) ...................... 10 2017 108 219.0

(51) Int. Cl.
| | |
|---|---|
| *G06F 9/38* | (2018.01) |
| *G06F 9/30* | (2018.01) |
| *G06F 11/34* | (2006.01) |
| *G06F 11/30* | (2006.01) |
| *G05B 19/042* | (2006.01) |

(52) U.S. Cl.
CPC ........ *G06F 9/3836* (2013.01); *G06F 9/30043* (2013.01); *G06F 9/30098* (2013.01); *G06F 11/3058* (2013.01); *G06F 11/3447* (2013.01); *G06F 11/3466* (2013.01); *G05B 19/0426* (2013.01)

(58) Field of Classification Search
None
See application file for complete search history.

(56) References Cited

U.S. PATENT DOCUMENTS

| | | | |
|---|---|---|---|
| 6,360,327 B1 | 3/2002 | Hobson | |
| 7,836,317 B2 | 11/2010 | Marchand | |
| 2002/0073262 A1 | 6/2002 | Godfrey | |
| 2003/0115506 A1 | 6/2003 | Edwards | |
| 2004/0102950 A1 | 5/2004 | Agarwala | |
| 2005/0152596 A1* | 7/2005 | Walmsley | ............ B41J 2/04505 382/162 |
| 2009/0096431 A1* | 4/2009 | Verschuur | ................. H02P 9/06 322/8 |
| 2011/0321061 A1 | 12/2011 | Craddock | |

OTHER PUBLICATIONS

Notice of Allowance dated Nov. 19, 2019 in connection with U.S. Appl. No. 15/945,027.

* cited by examiner

*Primary Examiner* — William B Patridge
(74) *Attorney, Agent, or Firm* — Eschweiler & Potashnik, LLC

(57) ABSTRACT

A method includes incrementing a counter with transmission of a process data from a first processor to a second processor, periodically decrementing the counter, if the counter is greater than a predetermined floor threshold value, wherein a period is a predetermined time interval; and stalling the first processor, if the counter is above a configurable load threshold value, so as to re-schedule the transmission of the process data from the first processor to the second processor.

18 Claims, 5 Drawing Sheets

| OPERATIONS MEMORY ||
|---|---|
| ADDRESS | VALUE |
| 011110 | 010101 |
| 011111 | 001110 |
| 100000 | 011000 |
| 100001 | 011011 |
| 100010 | 010001 |
| 100011 | 011100 |
| 100100 | 011010 |
| 100101 | 010101 |
| 100110 | 001111 |
| 100111 | 011101 |
| 101000 | 001011 |
| 101001 | 011001 |
| 101010 | 010110 |
| 101011 | 010110 |
| 101100 | 011000 |
| 101101 | 011000 |
| 101110 | 010001 |
| 101111 | 011101 |
| 110000 | 011101 |
| 110001 | 011001 |
| 110010 | 010111 |
| 110011 | 011101 |
| 110100 | 001111 |
| 110101 | 010011 |
| 110110 | 010011 |
| 110111 | 011010 |
| 111000 | 001110 |
| 111001 | 010010 |
| 111010 | 011110 |
| 111011 | 010011 |

FIG. 2A

CONTROL SYSTEM FOR PROCESS DATA AND METHOD FOR CONTROLLING PROCESS DATA

CROSS-REFERENCE TO RELATED APPLICATIONS

This application claims priority to German Application Serial No. DE 10 2017 108 219.0 filed Apr. 18, 2017 and claims priority benefit thereof. This application is hereby incorporated in its entirety.

FIELD

Various embodiments relate generally to a control system and a method of memory access.

BACKGROUND

A measuring apparatus detects a control unit variable of a control unit program which is executed in a control apparatus by a control unit processor. The control apparatus can be an engine controller for a motor vehicle, an embedded system or the like, which can be used to control actuators, for example electric motors, controllers or the like. The control unit processor uses a memory data connection with a detection device for detecting data which are transmitted on the memory data connection. The detecting device, for example, is a temperature sensor, a measuring transducer or the like that is connected to the control apparatus. The control unit processor executes a control program, for example in order to monitor the actuator, to control injection quantities of an internal combustion engine or the like.

The control unit processor is connected to a control unit memory of the control unit in order to store, for example, control parameters and other used, measured and/or calculated variables there. Thus, the control unit processor writes the control unit variable to a control unit memory. The control unit variable, for example, is a measured value, a temporary controller value, an output value at an actuator or the like. The variable may also comprise a program variable used by a program function.

The measuring apparatus has a buffer memory, to which, in a process herein also referred to as recording or tracing, the measuring apparatus writes the data which have been transmitted in memory access operations, i.e., when using the memory data connection, for transmission to a mapping memory, herein also referred to as a mirror memory. The mirror memory is thus made to hold a memory map of at least part of the control unit memory.

Recording the memory access operations of the control unit processor can be accomplished in multiple ways. In the case of microprocessors without internal peripherals and memories, it is conventional practice to record the external address/data bus and some control signals. The prerequisite for this so-called bus trace method is physical access to the memory interface of the control apparatus. Adapters which tap off the signals either directly from the control unit processor or directly from the memory module are typically used here. The signals may also be tapped off on the path between the control unit processor and the memory using Press-On adapters for conductor track pads or connectors. If a physical connection is possible in this manner, all memory access operations can be recorded and the program flow and all data access operations can be determined therefrom.

There are restrictions if the control unit processor is provided with a cache or internal RAM. In this case, the situation may occur in which no bus cycle appears on the external bus interface for a long period of time because all data required are already present in the internal memory and are executed there. In this case, a trace tool cannot record anything and the program behaviour remains hidden.

However, ever higher integration densities and pricing pressure have resulted in a processor core, cache, peripherals, flash and RAM memories being integrated in a single housing in many processors (system-on-chip). These processors often no longer even have an external memory interface. The bus trace method cannot be used in this case. Therefore, some processor architectures provide a special trace interface on the chip in addition to the debug interface. This trace interface can be used to make the program flow and data trace visible to the outside in compressed form.

A trace bus which has a width of 4, 8 or 16 bits and can be used to transmit program flow data and/or data access operations at a bus frequency of up to 400 MHz in compressed form is usually used as the trace interface. Other options are high-speed serial interfaces in the gigabit/s range with differential low-voltage swing signalling. In this case, the information on the address bus/data bus is transmitted in the manner in which it directly occurs in the CPU core with address and data values. This means that operations to access peripherals, chip-internal flash or RAM memory—in particular also cached operations—can also be recorded.

However, one disadvantage of this trace method is the high bandwidth needed to transmit the trace data. The problem is intensified in multi-core systems since the required bandwidth increases linearly with the number of processors.

SUMMARY

The following presents a simplified summary in order to provide a basic understanding of one or more aspects of the disclosure. This summary is not an extensive overview of the disclosure, and is neither intended to identify key or critical elements of the disclosure, nor to delineate the scope thereof. Rather, the primary purpose of the summary is to present some concepts of the disclosure in a simplified form as a prelude to the more detailed description that is presented later.

In one aspect, a method comprises associating at least one processor address register with a predetermined operation, invoking an instruction including a reference to an address register, and if the referenced processor address register is the associated processor address register. performing the predetermined operation.

In one aspect, a control system comprises an associated processor address register being associated with a predetermined operation and a first processor configured to invoke an instruction including a reference to a referenced processor address register. The control system is configured to perform, if the referenced processor address register is the associated processor address register, the predetermined operation.

In another aspect, a first processor is configured to be coupled to a second processor. The first processor comprises a counter configured to increment with a transmission of a process data to the second processor. In an alternate other aspect, a first processor is configured to be coupled to a second processor, the first processor comprises a counter configured to decrement with a transmission of a process data to the second processor.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

BRIEF DESCRIPTION OF THE DRAWINGS

The claimed subject matter is described below with reference to the drawings. As used herein, like terms refer to like elements throughout the description. The detailed description references the accompanying figures. The same numbers can be used throughout the drawings to reference like features and components. It should be noted that views of exemplary embodiments are merely to illustrate selected features of the embodiment.

FIGS. 2A, 2B and 2C show tables that schematically illustrate exemplary portions of memory according to some embodiments.

DETAILED DESCRIPTION

For purposes of explanation, numerous specific details are set forth in order to provide a thorough understanding of the claimed subject matter. It may be evident, however, that the claimed subject matter may be practised without these specific details.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, logical, and electrical changes may be made without departing from the scope of the disclosure. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

Figure 1:
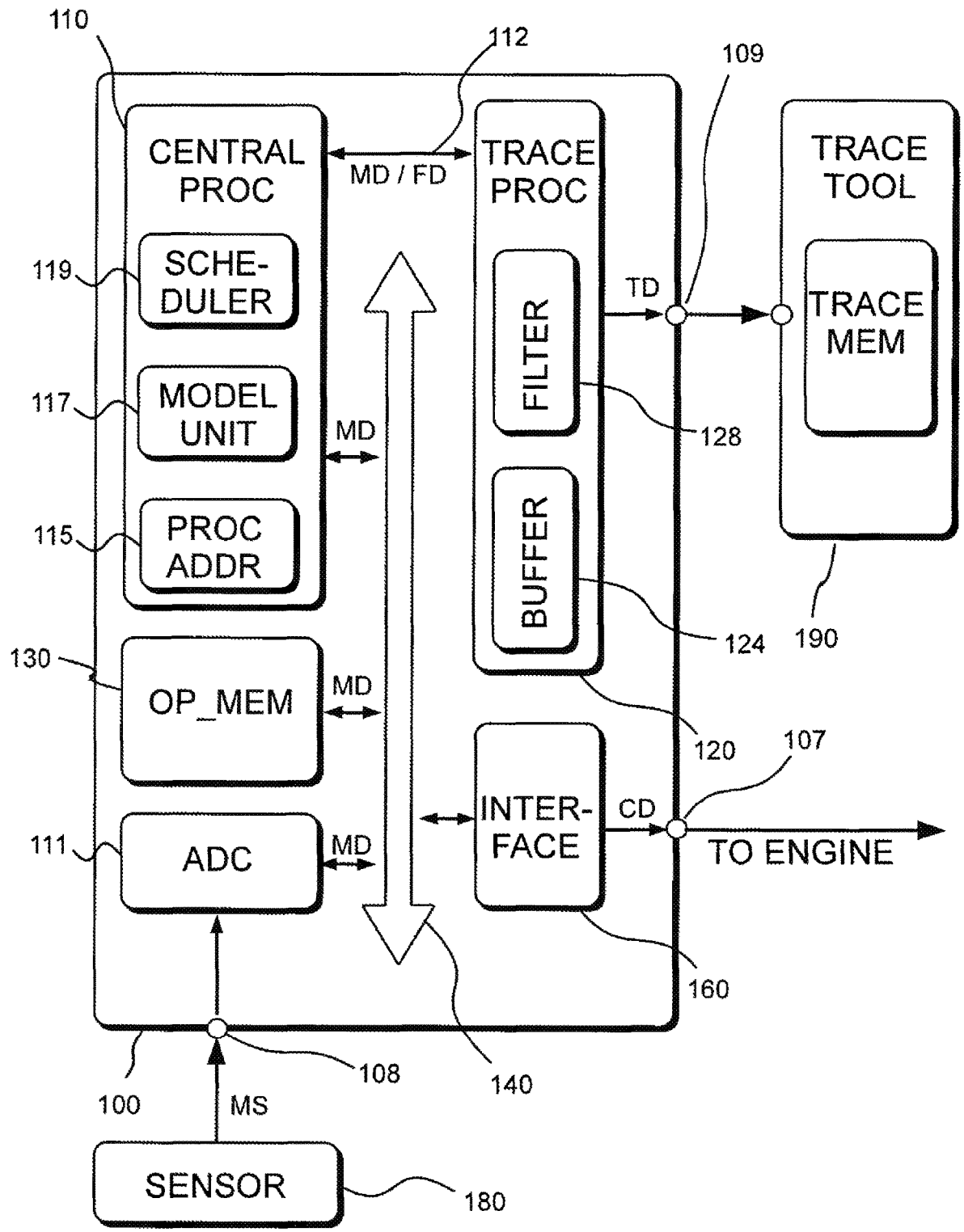
FIG. 1 shows a block diagram that illustrates an apparatus according to some embodiments.

FIG. 1 shows a block diagram that illustrates a measurement system including an apparatus according to some embodiments. The measurement system comprises a control system 100 that is, for example, configured to control an engine (not shown). In an implementation, merely as one example of an operative task performed by the control system 100, the control system is configured to execute a computer implemented instruction code in order to control a fuel injection pump (not shown). The control system 100 comprises a first processor, herein referred to as central processor 110 configured to derive data from a measurement signal MS, and a second processor, herein referred to as trace processor 120, that is configured to provide interface functionality for the control system 100 to communicate with other components of the measurement system as will be explained in more detail below.

Further, the control system 100 comprises a memory, herein referred to as operations memory 130. The central processor 110 and the trace processor 120 can be communicatively coupled by an inter-processor bus 112. Further, the central processor 110 and the memory can communicatively be coupled by a system bus 140. In some embodiments, the central processor 110 and the operations memory 130 are provided as separate components of the control system 100, for example, on separate circuit boards that are communicatively coupled by the system bus 140. The inter-processor bus 112 and/or the system bus 140 can implement coaxial line, wireline, optical fibre, wireless and other transmission media. In some embodiments, the control system 100 is provided as a control unit or control module as separate chips on one printed circuit board. In some embodiments, the control system 100 is provided as a system-on-chip with the central processor 110 and the trace processor 120 are co-located in one integrated circuit. As used herein, the wording "remote" encompasses a colocation in a single integrated circuit, albeit, in different areas of an integrated circuit chip. Still, the trace processor 120 can be remote from the central processor 110. The control system 100 comprises an input port 108 that is configured to receive values of a measurement signal MS, a control port 107 configured to output control signals CD, for example to an engine (not shown), and a trace port 109 that is configured to transmit trace data TD, for example, to a data recording device.

An embodiment of the measurement system comprises a sensor unit 180 that is configured to detect values associated with physical property such as pressure, temperature or acceleration. In the course of time, the detected values can vary continuously to form the analog measurement signal MS. In an alternate embodiment (not shown), the sensor unit 180 comprises an analog-to-digital converter that is configured to form a digital measurement signal. The sensor unit 180 can be configured to transmit the values of the measurement signal MS via a coupling to the input port 108 of the control system 100.

In some embodiments, the measurement system comprises a trace tool. The trace tool can be configured to record and/or analyze behaviour of the control system. In particular, the trace tool, in some embodiments, comprises a trace memory 190. The trace memory 190 is configured to receive, via a coupling to the trace port 109 of the control system 100, trace data TD and store the trace data TD. At least one effect can be that the trace memory 190 can be used as recording device for the trace data TD. In some embodiments, the control system 100 can be configured to co-operate with the trace tool under the condition that the trace tool is validated for co-operation. For example, the trace tool can comprise a certificate and the control system is configured to receive the certificate from the trace tool and verify a validity of the certificate. If the certificate is found valid, then the control system 100 co-operates with the trace memory 190 as, for example, described below.

Having regard to the control system 100, the central processor 110 comprises an analog-to-digital converter ADC 111 that is configured to convert values of the analog measurement signal MS received at the input port 108 to digital representations of the values. A sequence of digital representations generated in time on the basis of the values of the analog measurement signal MS thus forms digital measurement signal data (MD), i.e., a digital representation of the analog measurement signal MS.

The central processor 110 is configured to write, using system bus 140, the digital measurement signal data into the operations memory 130. For example, an instruction STORE can be defined that, when executed on the central processor 110, causes the central processor 110 to write the digital measurement signal data into the operations memory 130.

FIG. 2A shows a table that schematically illustrates an exemplary portion of the operations memory 130. For the sake of illustration, the addresses and also the values written at the addresses are denoted as binary numbers. It should be understood that values can also be written just the same, for example, as hexadecimal numbers. The illustrated portion of the operations memory 130 includes an address-space having 6-bit operations memory addresses, from 011110 to 111011. In some embodiments, the operations memory 130 includes a block of memory cells at a base address. In the example, four left-most bits, i.e., the four most significant bits, of the addresses in the address-space, i.e., the values 0111 . . . 1110, respectively, represent a respective base address. The right-most two bits, i.e., the two least significant bits, of the base address are padded, for example, with 0. In some embodiments, one or more of the least significant bits of the base address, instead of being padded, are used for signalling. For example, a 2-bit code can be written into the two least significant bits of the base address. In order to access the operations memory 130 at the base address, the 2-bit code is ignored and/or replaced with the padding. In order to determine signalled content for use in data processing and/or tracing, the 2-bit code can be interpreted.

In an example, the operations memory address is offset from the base address by an offset address. In the example illustrated in FIG. 2A, the operations memory addresses of the exemplary address-space can be represented as a sum of base address 011100 . . . 111000 plus the offset address in a range of from 00 to 11. For example, for the central processor 110 to address the operations memory 130, in some embodiments, the central processor 110 is configured to compose the operations memory address from the base address 0111 . . . 1110 and the offset address 00 . . . 11. In some embodiments, the offset address can be determined based on a previously used offset address, for example by incrementing the previously used offset address, or by decrementing the previously used offset address, wherein a constant step-width can be used that is predetermined. It should be understood that, while in the example the offset address is a 2-bit value, this is merely for illustrative purposes. In some implementations, the offset address encompasses a nibble, a byte, or any other number of digits commensurate with a size of an address range that is based on the base address. In some embodiments, a size of a block or range of data that should be subjected to the predetermined operation determines the length of the offset address. In some implementations (not shown), the offset address can be positive or negative. A representation of the offset address can include a bit to indicate a sign of the offset address. For example, the most significant bit (MSB) of the offset address can be interpreted as the sign of the offset address.

Again having regard to the control system 100, the central processor 110 comprises a processor address memory 115 that is configured to store a stored operations memory base address. A processor address register of the processor address memory 115 can be associated with a predetermined operation.

Figure 2B:
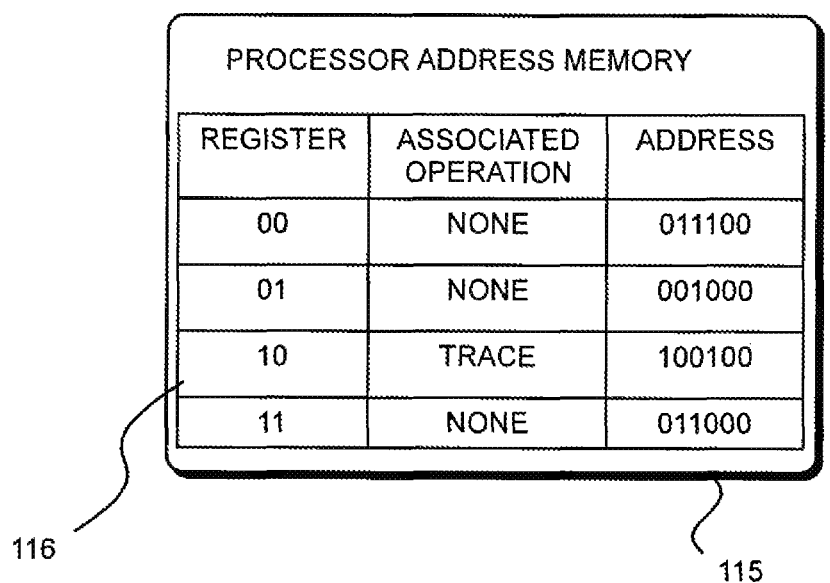

FIG. 2B shows a table that schematically illustrates an exemplary portion of the processor address memory 115 of the central processor 110. In the example illustrated in FIG. 2B, the processor address memory 115 encompasses four registers at register addresses 00, 01, 10 and 11. In the example, the base addresses 011100, 001000, 100100 and 011000 are written into the processor address memory 115 at the register addresses 00, 10, 10 and 11, respectively.

In some embodiments, at least one processor address register, i.e., the hardware itself, and/or at least one address of the processor address memory 115, i.e., a reference to one of the registers in the processor address memory 115 is associated with a predetermined operation. In the example illustrated in FIG. 2B, one of the processor address registers, the processor address register 10, is associated with an exemplary operation TRACE, while three other processor address registers, the registers 00, 01 and 11, are not associated with any operation. Thus, in the illustrated example, while the base addresses 011100, 001000 and 011000 are associated with no operation, the base address 100100 is associated with the TRACE operation. In some embodiments, the operation TRACE causes the control system 100 to write selected data to the trace port 109. In some embodiments, the predetermined operation is providing the selected data to the trace tool 190 that is coupled to the control system 100.

While in the illustrated example, the association of the processor address register with the predetermined operation is static, in some embodiments the association can be configurable, for example, by settings made prior to execution of software and/or by reconfiguring the settings during software execution. At least one effect can be that the software can control the conditions of the predetermined operation to be performed.

Generally, in some embodiments, a content of the referenced processor address register can be interpreted as to whether to perform the predetermined operation or not. The predetermined operation is only performed, if a result of the interpreting the content indicates that the predetermined operation should be performed. In some embodiments (not shown), the interpreting the content of the referenced processor address register comprises comparing at least a portion of the content to a predetermined representation associated with the predetermined operation. The result of the interpreting is determined to indicate that the predetermined operation should be performed, if the portion of the content equals the predetermined representation. For example (not shown), one or more selected base addresses can be selectively predetermined for tracing. The predetermined operation such as tracing will be performed only, if the base address register contains a predetermined selected base address, Generally, in some embodiments, in the instruction invoked by the first processor, a control code can be included with the reference to the referenced processor address register. The control code is indicative of whether to perform the predetermined operation or not. In some implementations, performing the predetermined operation only takes place, if the control code indicates that the predetermined operation should be performed. For example, in some implementations, the processor 110 uses the least significant bit of the base address in order to control that the instruction should be subject to tracing. In this example, where the processor address register 116 is associated with the exemplary operation TRACE, depending on the least significant bit of the base address, the operation TRACE is invoked or not. In one implementation, all base address registers of the first processor are associated with the predetermined operation. In this case, the predetermined operation is invoked only depending how the processor sets the control bit.

Generally, any bit in an argument of the instruction can be used to indicate whether to perform the predetermined operation or not. For example, in some implementations (not shown), the sign of the address offset is used to indicate whether to perform the predetermined operation or not. Thus, the predetermined operation is only performed, if the sign of the address offset indicates that the predetermined operation should be performed. For example, in some implementations, the processor is adapted to interpret a most significant bit of a representation of the address offset as a sign of the address offset. The first processor is further configured to use the sign of the address offset in order to control that the instruction should be subject to tracing. In this example, where the processor address register is associated with the exemplary operation TRACE, depending on the sign of the address offset being 1 or 0, the operation TRACE is invoked or not. In one implementation, all base address registers of the first processor are associated with the predetermined operation. In this case, absent any other control bit to indicate whether to perform the predetermined operation or not, the predetermined operation is invoked only depending how the processor sets the sign bit.

While in the illustrated example, the association of the processor address register with the predetermined operation is unconditional, in some embodiments, the association can depend, for example, on an instruction invoked to access the operations memory address. In an example, the control system 100 is configured such that an association of a processor address register with a predetermined operation is defined or valid, if the instruction that causes an access at a particular processor address register that is associated with the predetermined operation is a first instruction, for example, a STORE instruction. However, the association of the processor address register with the predetermined operation is not defined or invalid, if the instruction that causes the access at the processor address register that is associated with the predetermined operation is a second instruction, for example, a READ instruction.

In some embodiments, the central processor 110 is configured to provide the information about a selected processor address register being associated with a predetermined operation, herein also referred to as filter data (FD), to the trace processor 120 for use in processing the digital measurement signal data (DM). In the example discussed above with reference to FIG. 1 and FIG. 2B, using the inter-processor bus 112, the central processor 110 can provide the information about the base address 100100 being associated with the TRACE operation to the trace processor 120.

Referring back to FIG. 1, the trace processor 120 will now be described in more detail. As will be seen, the trace processor 120 can be configured to determine, based on filter data (FD) received from the central processor 110, if an access to the operations memory address should be traced.

Further, in some embodiments, the trace processor 120 comprises a filter module 128 that is configured to filter the digital measurement signal data (MD) based on the filter data (FD) received from the central processor 110 so as to obtain selected data, herein also referred to as trace data (TD). In some embodiments, the filter data (FD) are merely a flag indicative of the predetermined operation to be taken. In some embodiments, the trace processor 120 is configured to interpret the flag such that the digital value about to be written to the operations memory 130 should also be used as an operand in execution of the associated operation.

In some embodiments, the control system 100 is configured to override the filter module 128. At least one effect can be that the predetermined operation is not performed even though the filter module 128 found that the predetermined operation should be performed. For example, overriding can be used with an Interrupt-Service-Routine (ISR) operation.

Interrupt services can be unrelated to a flow of processes in accordance with software instructions executed by the central processor 110. Accordingly, it may be undesirable to trace an access of an interrupt service to the processor address register 116 that is associated with the predetermined operation may. At least one effect of overriding, for example, can be that to avoid undesired tracing of interrupt service accesses to the processor address register despite processor address register's association with tracing as the predetermined operation.

In some embodiments, the first processor comprises a counter configured to increment with a transmission of a process data to the second processor. The counter is configured to periodically decrement. The first processor is configured to stall, if the counter is above a configurable load threshold value. In some alternate embodiments, the counter is configured to periodically increment. The first processor is configured to stall, if the counter is below a configurable load threshold value. As will be described in more detail below, at least one effect can be that the transmission of the process data to the second processor is re-scheduled.

Still with reference to FIG. 1, further aspects of the central processor 110 in accordance with a general aspect outlined above will now be described in more detail.

In some embodiments, the central processor 110 comprises a modelling unit 117 configured to model an operation of the trace processor 120, based on the selected data transmitted from the central processor 110 to the trace processor 120. In some embodiments, the modelling unit 117 is implemented as a state machine. In some embodiments, the modelling unit 117 is configured to determine an expected load status such as a load status of the trace processor 120. In some embodiments, the modelling unit 117 is configured, when modelling the operation of the trace processor 120, to use a previous provision of selected data to the trace processor. For one example, the modelling unit 117 is provided as a counter that is configured to model the operation of the trace processor 120 by counting transmissions of data from the central processor 110 to the trace processor 120. In some embodiments, the modelling unit 117 is configured, when modelling the operation of the trace processor 120, to use the selected data provided by the trace processor to the trace port 109.

For another example, the modelling unit 117 is provided as a counter that is configured to model the operation of the trace processor 120 by counting transmissions of data from the trace processor 120 to the trace port 109.

In an embodiment, where the buffer 124 is configured as a FIFO buffer, a buffer fill level can thus be modelled. The modelling of an operation of the trace processor 120 can include modelling or simulating filling of the data buffer 124 with the selected data and/or removing the selected data from the data buffer 124.

For example, the modelling unit 117 is provided as a counter that is configured to model the operation of the trace processor 120 by incrementing with each transmission of data from the central processor 110 to the trace processor 120 and by decrementing proportional to a clock count. In one embodiment, the modelling unit 117 continuously checks, if a clock value since a most recent decrement of a transmission counter value exceeds a duration that the trace processor 120 requires, on average, for processing the content of one register of the buffer 124. If so, the modelling unit 117 decrements the transmission counter value and resets the clock value to zero.

In some embodiments, the central processor 110 comprises a scheduler 119. The scheduler 119 is configured to re-schedule, if the expected load status is a predetermined overload status, a transmission or other provision of the selected data from the central processor 110 to the trace processor 120. For example, the scheduler 119 can delay the transmission by a predetermined amount of clock cycles. In some embodiments, the scheduler can predetermine the amount of clock cycles for the delay to be commensurate with an expected or otherwise determined level of overload. In some embodiments, the scheduler 119 is configured to invoke a no-operation instruction NOP that stalls the processor. At least one effect can be to re-schedule the provision of the data to the trace processor 120. At least one further effect can be that the buffer 124 of the trace processor 120 is kept from suffering overflow.

In some embodiments, the trace processor 120 can be provided as a state machine. In still another embodiment, the trace processor 120 is integrated with the central processor 110. Thus, the central processor 110 provides the functionality of the trace processor 120.

Figure 2C:
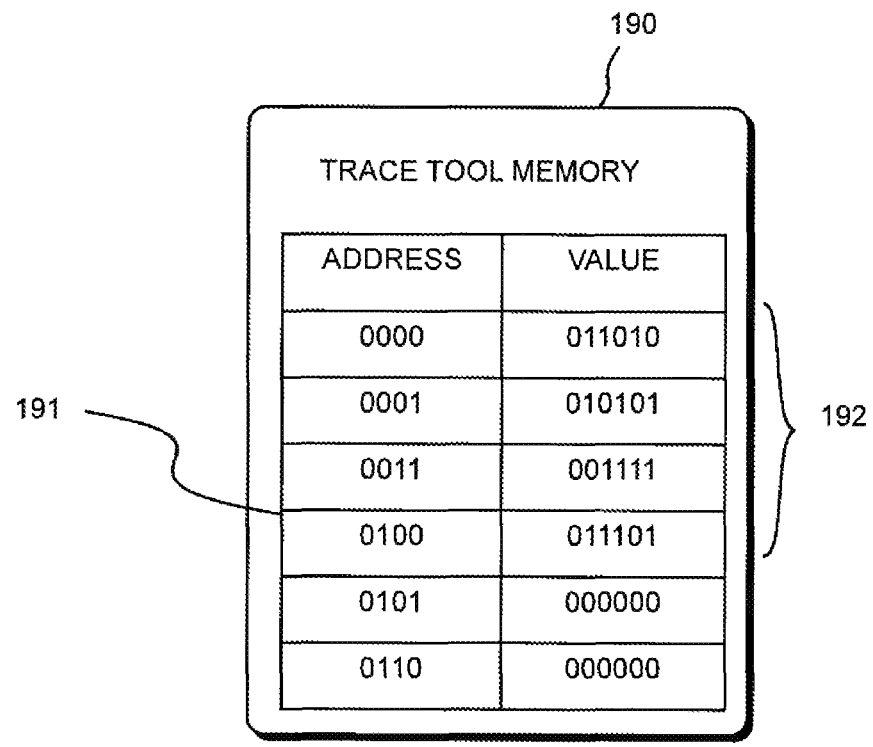

FIG. 2C shows a table that schematically illustrates an exemplary portion of a memory of a trace tool 190 of the control system 100. In the example illustrated in FIG. 2C, the memory of trace tool 190 encompasses six memory cells at addresses 0000 . . . 0110 and holds a block 192 of trace data. As will be explained below, this block of data is a copy or 'trace' of a block 132 of digital measurement signal data stored in the operations memory 130.

Generally, a method comprises incrementing a counter with transmission of a process data from a first processor to a second processor and periodically decrementing the counter, if the counter is greater than a predetermined floor threshold value. In some embodiments, the method comprises stalling the first processor, if the counter is above a configurable load threshold value. In a complementary aspect, a method comprises decrementing a counter with transmission of a process data from a first processor to a second processor and periodically incrementing the counter, if the counter is less than a predetermined ceiling threshold value. In some embodiments, the method comprises stalling the first processor, if the counter is below a configurable load threshold value. At least one effect of stalling can be that the transmission of the process data from the first processor to the second processor is re-scheduled. In some embodiments, the method further comprises using the first processor to implement the counter.

In some embodiments, a period is a predetermined time interval, for example a predetermined number of clocks. In some embodiments, the predetermined time interval is equal to or larger than an average time required by the second processor for processing the process data. In some embodiments, the predetermined time interval is larger than a maximum time required by the second processor for processing the process data.

In some embodiments, processing the process data by the second processor comprises writing selected data to a trace port. In some embodiments, processing the process data by the second processor comprises filtering the process data based on a referenced processor address register so as to obtain the selected data. In some embodiments, the method further comprises deriving the process data from a measurement signal.

Figure 3A:
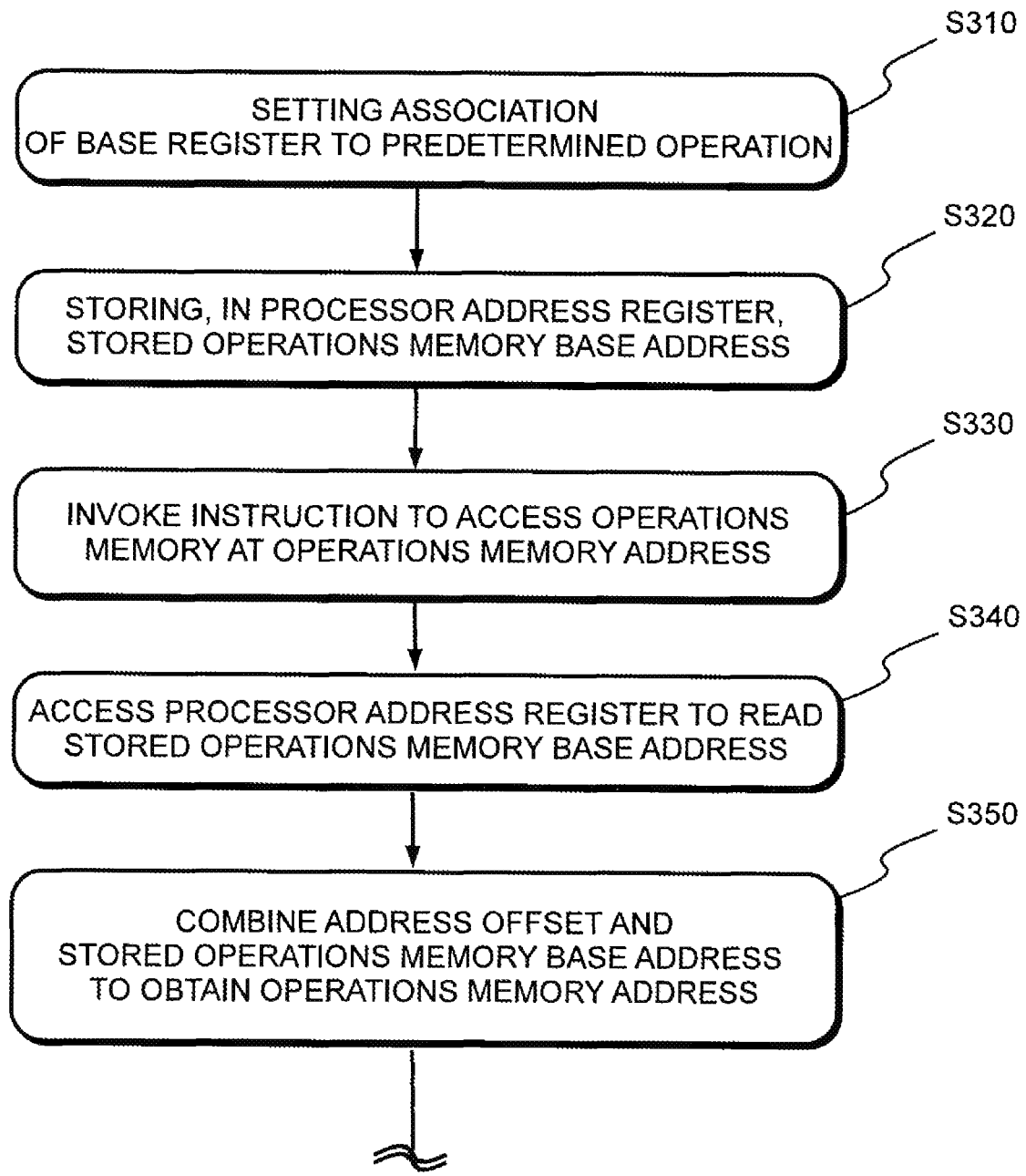
FIG. 3 shows a flow chart that illustrates an exemplary method according to some embodiments.
Figure 3B:
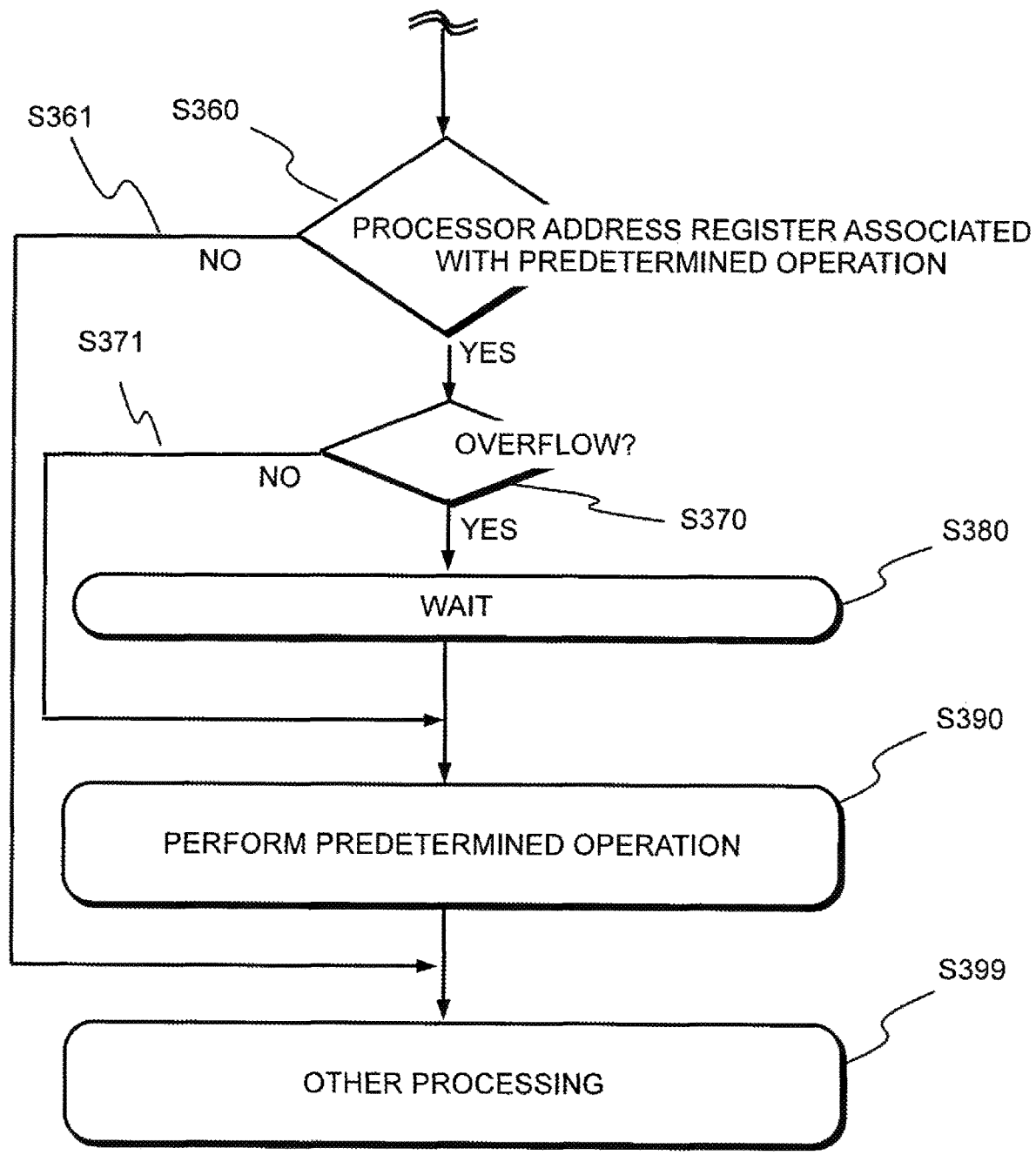

Below an exemplary operation of the control system 100 in accordance with a general aspect outlined above will briefly be described with reference to FIGS. 3A-3B which shows a flow chart that illustrates an exemplary method according to some embodiments. Reference will also be made to FIGS. 1, 2A, 2B and 2C.

At S310, a processor address register is associated with a predetermined operation. In the example illustrated in FIG. 2B, the predetermined operation is a TRACE operation. The TRACE operation is associated with the processor address register 10.

At S320, a stored operations memory base address is stored in the processor address register. In the example illustrated in FIG. 2B, the stored operations memory base address is 100100.

At S330, an instruction is invoked that accesses the operations memory 130. For example, the instruction can be a STORE instruction that, when executed, causes the central processor 110 to write a value of the digital measurement signal into the operations memory. In the example illustrated in FIG. 2A, the digital measurement signal value represented by the bits 011101 is to be stored at the operations memory address 100111 (shown in FIG. 2A at reference numeral 131). However, rather than directly addressing the operations memory address 100111, the STORE instruction uses processor address register 116 and an address offset. For example, the STORE instruction has the argument (processor address register 116, address offset 11, value 011101).

At S340, the STORE instruction causes the processor to read the operations memory base address 100100 from the processor address register 116.

At S350, the STORE instruction causes the processor to combine the operations memory base address 100100 with the address offset 11 in order to obtain the operations memory address 100111. Further, the execution of the STORE instruction can proceed to write, using the system bus 140, the value 011101 into the memory cell of the operations memory 130 having the operations memory address 100111 as illustrated in FIG. 2A.

At S360, the processor determines, if the processor address register 116 is associated with a predetermined operation. If no association is determined, then, at S361, the flow moves on to another processing step S399. However, in the example illustrated in FIG. 2B, the processor address register 116 is associated with the operation TRACE and, therefore, the exemplary operation carries on to perform the predetermined operation.

At S370, the modelling unit 117 checks, if the trace processor 120 is ready to process further data. The modelling unit 117 checks, if the transmission counter value exceeds a predetermined limit. If an overflow is determined, then, at S380, the scheduler 119 delays the further processing. If no overflow is determined, then, at S371, the flow moves on to another processing step S399. A copy of the value 011101 is transmitted, using the inter-processor bus 112, to the buffer 124 of the trace processor 120, and, in accordance with the transmission, the modelling unit 117 increments the transmission counter value.

At S390, the associated predetermined operation is performed. In the illustrated example, the TRACE operation is performed. In the illustrated example, in accordance with filter data FD, the filter module 128 selects the binary representation 011101 to be provided as trace data (TD). The trace data TD, i.e., the bits 011101 are output at the trace port 109. As illustrated in FIG. 2C, in some embodiments, where the trace tool 190 is coupled to the trace port 109, the binary representation 011101 of the trace data TD can then be written to the memory of trace tool 190 at the address 0100 (shown in FIG. 2C at reference numeral 191). In the example illustrated in FIGS. 2A and 2C, tracing of one block 132 of four digital measurement signal data, stored in the operations memory at the base address 100100, is thus completed. Accordingly, a block 191 of trace data is thus stored in the memory of trace tool 190 that are a copy or trace of the block 132 of data stored in the operations memory 130.

At S399, the operation of the control system 100 continues with other processing.

In a further exemplary embodiment, a control system comprises an operations memory and a first processor coupled to the operations memory. The first processor is configured to derive digital measurement signal data from a measurement signal. The first processor is further configured to write the digital measurement signal data into the operations memory at an operations memory address. The control system further comprises a second processor that is coupled to the first processor and configured to process, for instance filter and compress the digital measurement signal data based on the operations memory address so as to obtain selected data.

In one exemplary aspect, a method for use in providing data from a first processor to a second processor comprises using the first processor to determine an expected load status of the second processor and, if the expected load status is a predetermined overload status, re-schedule a provision of data from the first processor to the second processor.

In another exemplary embodiment, a first processor configured to be coupled to a second processor, the first processor comprises a scheduler configured to schedule a transmission of data to the second processor, and a modelling unit configured to model an operation of the second processor on data transmitted from the first processor to the second processor to determine an expected load status. The scheduler is configured to re-schedule transmission of data to the second processor, if the expected load status is a predetermined overload status.

In still another exemplary embodiment aspect, a control system comprises a first processor configured to derive data from a measurement signal, and a second processor that is coupled to the first processor and remote from the first processor. The first processor comprises a modelling unit configured to model an operation of the second processor on data transmitted from the first processor to the second processor to determine an expected load status.

In some embodiments (not shown), the control system comprises a plurality of first processors or central processors. The plurality of first processors can be coupled to a common bus and, via the common bus, to a common operations memory. The concepts and principles outlined below with respect to one central processor can, thus, also be implemented with more than one central processor.

In the above description of exemplary implementations, for purposes of explanation, specific numbers, materials configurations, and other details are set forth in order to better explain the disclosure, as claimed. However, it will be apparent to one skilled in the art that the claimed disclosure may be practised using different details than the exemplary ones described herein.

Although some aspects have been described in the context of an apparatus, these aspects also represent a description of the corresponding method, where a block or device corresponds to a method step or a feature of a method step. Analogously, aspects described in the context of a method act also represent a description of a corresponding block or item or feature of a corresponding apparatus.

The disclosed arrangements may be implemented partially or fully in hardware using logic circuits or VLSI design.

The implementations herein are described in terms of exemplary embodiments. However, it should be appreciated that individual aspects of the implementations may be separately claimed and one or more of the features of the various embodiments may be combined. In some instances, well-known features are omitted or simplified to clarify the description of the exemplary implementations.

As used herein, the word 'exemplary' means serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion.

As used herein, the term 'or' is intended to mean an inclusive 'or' rather than an exclusive 'or.' That is, unless specified otherwise or clear from context, 'X employs A or B' is intended to mean any of the natural inclusive permutations. That is, if X employs A; X employs B; or X employs both A and B, then 'X employs A or B' is satisfied under any of the foregoing instances.

As used herein, the articles 'a' and 'an' should generally be construed to mean 'one or more,' unless specified otherwise or clear from context to be directed to a singular form.

As used herein, the terms 'coupled' and 'connected' may have been used to describe how various elements interface. Unless expressly stated or at least implied otherwise, such described interfacing of various elements may be either direct or indirect.

As used herein, the terms 'having', 'containing', 'including', 'with' or variants thereof, and like terms are open ended terms intended to be inclusive. These terms indicate the presence of stated elements or features, but do not preclude additional elements or features.

As used herein, the word 'continuous' is to be understood in accordance with an implemented underlying mode of operation. For example, if a system is understood to operate in a clocked mode, the wording 'continuous operation' can mean an operation in the clocked mode while the wording does not address operation in another mode.

As used herein, the term 'module' can refer to any known or later developed hardware, software, firmware, or combination thereof that is capable of performing the functionality associated with that element.

As used herein, the terms 'determine', 'calculate' and 'compute', and variations thereof, are used interchangeably and include any type of methodology, process, mathematical operation or technique.

As used herein, terms such as 'first', 'second', and the like, are also used to describe various elements, regions, sections, etc. and are also not intended to be limiting.

The invention claimed is:

1. A method, comprising either acts (A1) to (A3) or acts (B1) to (B3), but not both acts (A1) to (A3) and acts (B1) to (B3) simultaneously:
   (A1) incrementing a counter with a transmission of a process data from a first processor to a second processor;
   (A2) decrementing the counter at a regularly recurring predetermined time interval if the counter is greater than a predetermined floor threshold value, wherein the predetermined time interval comprises a predetermined number of clock cycles; and
   (A3) stalling the first processor if the counter is above a configurable load threshold value so as to re-schedule the transmission of the process data from the first processor to the second processor;
   or (B1) decrementing the counter with the transmission of the process data from the first processor to the second processor;

(B2) incrementing the counter at the regularly recurring predetermined time interval if the counter is less than a predetermined ceiling threshold value, wherein the predetermined time interval comprises a predetermined number of clock cycles; and (B3) stalling the first processor if the counter is below the configurable load threshold value so as to re-schedule the transmission of the process data from the first processor to the second processor.

2. The method of claim 1, further comprising:
using the first processor to implement the counter.

3. The method of claim 1, wherein the predetermined time interval is equal to or larger than an average time required by the second processor for processing the process data.

4. The method of claim 3, wherein the predetermined time interval is larger than a maximum time required by the second processor for processing the process data.

5. The method of claim 4, wherein processing the process data by the second processor comprises:
writing selected data to a trace port.

6. The method of claim 5, wherein processing the process data by the second processor comprises filtering the process data based on a referenced processor address register so as to obtain the selected data.

7. The method of claim 1, further comprising:
deriving the process data from a measurement signal.

8. A first processor configured to be coupled to a second processor, the first processor comprising either acts (A1) to (A3) or acts (B1) to (B3), but not both acts (A1) to (A3) and acts (B1) to (B3) simultaneously:

(A1) a counter configured to increment with a transmission of a process data to the second processor, (A2) wherein the counter is configured to decrement at a regularly recurring predetermined time interval if the counter is greater than a predetermined floor threshold value, wherein the predetermined time interval comprises a predetermined number of clock cycles, and (A3) wherein the first processor is configured to stall if the counter is above a configurable load threshold value so as to re-schedule the transmission of the process data to the second processor;

or (B1) the counter configured to decrement with the transmission of the process data to the second processor, (B2) wherein the counter is configured to increment at the regularly recurring predetermined time interval if the counter is less than a predetermined ceiling threshold value, wherein the predetermined time interval comprises a predetermined number of clock cycles, and (B3) wherein the first processor is configured to stall if the counter is below the configurable load threshold value so as to re-schedule the transmission of the process data to the second processor.

9. The first processor of claim 8, wherein the predetermined time interval is equal to or larger than an average time required by the second processor for processing the process data.

10. The first processor of claim 9, wherein the predetermined time interval is larger than a maximum time required by the second processor for processing the process data.

11. The first processor of claim 8, further comprising:
a scheduler configured to schedule the transmission of data to the second processor, wherein the scheduler is configured to stall the first processor.

12. The first processor of claim 11, wherein the scheduler is configured to invoke a no-operation instruction to re-schedule the transmission of the process data to the second processor.

13. The first processor of claim 8, wherein the second processor is implemented as a state machine.

14. A control system, the system comprising acts (A1) to (A3) and, either acts (B1) to (B3) or acts (C1) to (C3) but not both acts (B1) to (B3) and acts (C1) to (C3) simultaneously:

(A1) a first processor configured to process data; and (A2) a second processor coupled to the first processor, (A3) wherein the first processor is configured to transmit the process data to the second processor, and (B1) wherein the first processor comprises a counter configured to increment with a transmission of a process data to the second processor, and (B2) wherein the counter is configured to decrement at a regularly recurring predetermined time interval if the counter is greater than a predetermined floor threshold value, wherein the predetermined time interval comprises a predetermined number of clock cycles, and (B3) wherein the first processor is configured to stall if the counter is above a configurable load threshold value so as to re-schedule the transmission of the process data to the second processor, or (C1) wherein the counter is configured to decrement with the transmission of the process data to the second processor, and (C2) wherein the counter is configured to increment at the regularly recurring predetermined time interval if the counter is less than a predetermined ceiling threshold value, wherein the predetermined time interval comprises a predetermined number of clock cycles, and (C3) wherein the first processor is configured to stall if the counter is below the configurable load threshold value so as to re-schedule the transmission of the process data to the second processor.

15. The control system of claim 14, wherein the predetermined time interval is equal to or larger than an average time required by the second processor for processing the process data.

16. The control system of claim 14,
wherein the second processor comprises a data buffer, and
wherein processing the process data by the second processor includes filling of the data buffer with process data and/or removing the process data from the data buffer.

17. The control system of claim 14, wherein the first processor and the second processor are co-located in one integrated circuit.

18. The control system of claim 14, wherein the control system is configured to control an engine.

* * * * *